UNITED STATES PATENT OFFICE.

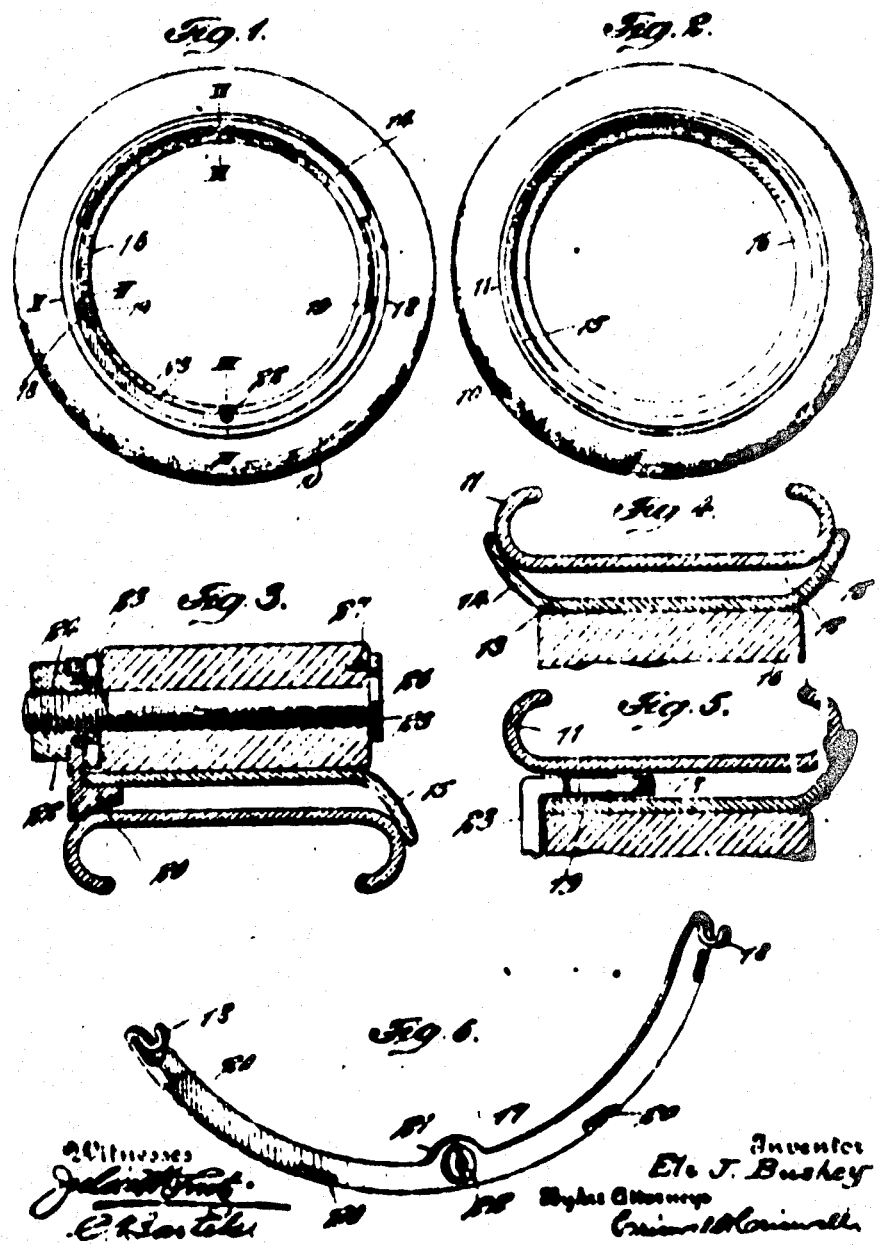

ELI J. BUSHEY, OF NEW YORK, N. Y.

REMOVABLE RIM.

994,974.

Specification of Letters Patent.   Patented June 13, 1911.

Application filed August 20, 1910. Serial No. 578,240.

*To all whom it may concern:*

Be it known that I, ELI J. BUSHEY, a citizen of the United States, and a resident of New York, county and State of New York, have invented certain new and useful Improvements in Removable Rims, of which the following is a full, clear, and exact description.

This invention relates more particularly to means whereby the tire and clencher rim for automobile wheels may be quickly removed or placed in position.

The primary object of the invention is to provide simple and efficient means whereby the tires of automobiles or other vehicle wheels and particularly pneumatic tires may have the casing and tire part remain held to the usual clencher or a quickly detachable rim and this clencher rim so held to the felly that it may be quickly detached with the tire for repairs or to place another in its stead, and which rim and tire when in position will be positively and rigidly locked so as to form a part of the wheel.

A further object of the invention is to provide simple and efficient means for locking the clencher rim to the felly and to so construct the locking means that it may be readily made and applied.

With these and other objects in view, the invention will be hereinafter more particularly described with reference to the accompanying drawing, which forms a part of this specification, and will then be pointed out in the claims at the end of the description.

In the drawing, Figure 1 is an elevation of one form of wheel embodying my invention, looking at the side having the locking means. Fig. 2 is a similar view of Fig. 1 except that it shows the other side of the wheel. Fig. 3 is an enlarged fragmentary section taken on the line III—III of Fig. 1. Fig. 4 is an enlarged fragmentary section taken on the line IV—IV of Fig. 1. Fig. 5 is a fragmentary transverse section, taken on the line V—V of Fig. 1; and Fig. 6 is a detail perspective view of the locking member.

While I show the invention as applied more particularly to the pneumatic tires such as used on automobiles, it will be understood that the invention may be adapted to other forms of wheels where a detachable rim of a wheel is desired.

The wheel has a casing 10 which may inclose the usual pneumatic tube and said casing has the usual parts which are adapted to be held by the flanges of the clencher rim or detachable member 11 in the usual way, said clencher rim in this case being adapted to hold the casing and inner tube as a part thereof. This clencher rim is adapted to be seated in the channel 12 of the felly rim 13 of the felly or fixed member, and this felly rim has flanges 14 and 15 on each side of the same which form a channeled space 12 between the clencher rim and the felly rim. As shown the felly rim is secured to the wooden felly 16 and the flange 15 extends entirely around the wheel while the flange 14 only a part of the distance as shown in Fig. 1, the said flange being cut away for the greater part of the peripheral distance of the wheel.

To hold the clencher rim and to lock the same with the casing and inner tube to the felly rim, I provide a locking member 17. This locking member is in the form of a curved plate and said plate at its ends is provided with hooked portions 18 which are adapted to engage lugs or pins 19 projecting from the felly rim and entering the space or channel 12, though instead of the hooked portions and lugs or pins other means may be employed. The member 17 is of sufficient width to overlap a part of the clencher rim and a part of the felly and is provided with wedge portions or devices 20 which are adapted to enter the space 12 and engage the clencher rim in such a way as to force the same rigidly against the flange 15 of the felly rim. The locking member 17 is enlarged, as at 21, and said enlarged portion has an opening therethrough in which is rotatably held a nut 22. This nut 22 has a part fitting the opening of the enlarged part 21 and has a flange or washer 23 secured thereto so that said nut is held to the member 17 in such a way that it may be rotated on the enlarged part and still cause the locking member 17 to move therewith, and said nut 22 is adapted to engage the threaded end 24 of a bolt 25. The bolt 25 passes through the wooden felly and has a head 26 which may be secured by a screw 27 or otherwise so as to be permanently held to the felly.

When it is desired to remove the casing with its clencher rim, the nut 22 is released and that will release the wedges 20 from forcing the clencher rim against the flange 15 of the felly, and when said locking member 17 is sufficiently released it may be moved to a position to release the hooked portions 18 from the pins or projections 19. If the wheel is on an automobile or other vehicle, the said vehicle is raised from the ground by means of a jack as usual and when the clencher rim is released, as already described, the lower part thereof will be free so that the same may be moved outward free of the felly and when the lower part is thus free, it will be at an angle and the said clencher rim may be raised sufficiently to permit the same to be lifted over the flange 14 of the felly rim. If a new casing and tube is placed into position the reverse of the operation just described takes place. That is the clencher rim with its casing is slipped over the upper part of the wheel so as to rest between the flanges 14 and 15 at the upper part thereof and then the lower part is forced inward. In this position the locking member 17 is sprung far enough to cause the hooked ends 18 to engage the projections 19. The nut 24 on the bolt 25 of the locking member 17 is forced inward causing the wedge portions 20 to enter the space or channel 12 and hold the clencher member rigidly between the flanges 15 and 14 and the locking member 17.

From the foregoing, it will be seen that simple and efficient means is provided whereby a defective casing and tube with its clencher rim may be quickly removed or attached to the wheel; that simple means is provided for effectively locking the casing and clencher rim to the felly; and that said locking means is simple in construction and may be applied to various kinds or constructions of wheels.

Having thus described my invention, I claim as new and desire to secure by Letters Patent:

1. In a wheel, the combination of a felly, a rim on the felly and provided with a flange at one side extending around the rim, the rim at the opposite side of the wheel having a flange located on one circumferential portion of the rim only, the rim at the opposite circumferential portion being provided with a lug at each of two portions removed a short distance from the extremity of said short flange, a clencher rim surrounding the first-mentioned rim and held in place on one side by the said flange on the inner rim, and a locking member having at its extremities hook portions adapted to be inserted on said lugs by a movement radial of the wheel previous to positioning of the outer rim, the locking member being provided with wedge portions that serve to offset the clencher rim from the other rim between the said lug portions, and means for securing the locking member to one of the wheel members.

2. In a wheel, the combination of a felly, a rim on the felly provided with a flange at one side extending around the rim, the rim at the opposite side of the wheel having a flange located on one circumferential portion of the rim only, the rim at the opposite circumferential portion being provided with a lug at each of two portions removed a short distance from the extremity of said short flange, a clencher rim surrounding the first-mentioned rim and held in place on one side by the said flange on the inner rim, and a locking member having at its extremities hook portions adapted to be inserted on said lugs by a movement radial of the wheel previous to positioning of the outer rim, the locking member being provided with wedge portions that serve to offset the clencher rim from the other rim between the said lug portions, and means for securing the locking member at its middle part to the wheel.

This specification signed and witnessed this 18th day of August A. D. 1910.

ELI J. BUSHEY.

Witnesses:
W. A. TOWNER, Jr.,
C. BARTELS.